US010479162B2

(12) United States Patent
Elson et al.

(10) Patent No.: US 10,479,162 B2
(45) Date of Patent: Nov. 19, 2019

(54) VEHICLE SEAT BELT HAVING TUBES FOR AIR DELIVERY

(71) Applicant: Ford Global Technologies, LLC, Dearborn, MI (US)

(72) Inventors: John Craig Elson, Bloomfield Township, MI (US); Kerrie Gath, Pittsfield, MI (US); Clay Wesley Maranville, Ypsilanti, MI (US); Victoria Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 15/834,266

(22) Filed: Dec. 7, 2017

(65) Prior Publication Data

US 2019/0176567 A1    Jun. 13, 2019

(51) Int. Cl.
| | |
|---|---|
| *B60H 1/00* | (2006.01) |
| *B60R 22/12* | (2006.01) |
| *B60H 1/22* | (2006.01) |
| *B60R 21/18* | (2006.01) |
| *B60R 22/18* | (2006.01) |

(52) U.S. Cl.
CPC ....... *B60H 1/00271* (2013.01); *B60H 1/2225* (2013.01); *B60R 22/12* (2013.01); *B60R 21/18* (2013.01); *B60R 2022/1806* (2013.01)

(58) Field of Classification Search
CPC .. B60H 1/00271; B60H 1/2225; B60R 22/12; B60R 22/14; B60R 22/16; B60R 2022/1806; B60R 21/18
See application file for complete search history.

(56) References Cited

U.S. PATENT DOCUMENTS

| | | | |
|---|---|---|---|
| 3,306,662 A | | 2/1967 | Finnigan |
| 3,682,498 A | * | 8/1972 | Rutzki ................... B60R 21/18 |
| | | | 280/733 |
| 3,801,156 A | | 4/1974 | Granig |
| 3,820,814 A | | 6/1974 | Allgaier et al. |
| 3,865,398 A | * | 2/1975 | Woll ...................... B60R 21/18 |
| | | | 280/733 |

(Continued)

FOREIGN PATENT DOCUMENTS

| | | |
|---|---|---|
| AT | 300591 | 7/1972 |
| DE | 102008034633 A1 | 1/2010 |

(Continued)

OTHER PUBLICATIONS

U.S. Appl. No. 15/834,170, filed Dec. 7, 2017, entitled "Vehicle Seat Belt System Having Electrical Connector," (21 pages of specification and 22 pages of drawings) and filing receipt.

(Continued)

*Primary Examiner* — Barry Gooden, Jr.
(74) *Attorney, Agent, or Firm* — Vichit Chea; Price Heneveld LLP

(57) ABSTRACT

A vehicle seat belt system is provided. The vehicle seat belt system includes a seat belt comprising first and second seat belt webbings each defining a passageway, and one or more tubular extension members extending between the first and second seat belt webbings. The vehicle seat belt system also includes a plurality of exhaust openings formed in at least one of the first and second webbings, and an air delivery device supplying air to the seat belt.

19 Claims, 6 Drawing Sheets

(56) References Cited

U.S. PATENT DOCUMENTS

| | | | |
|---|---|---|---|
| 3,866,940 A * | 2/1975 | Lewis | B60R 21/18 280/733 |
| 3,874,694 A * | 4/1975 | Stephenson | B60R 21/18 280/733 |
| 3,887,213 A | 6/1975 | Goetz | |
| 3,905,615 A | 9/1975 | Schulman | |
| 3,970,329 A * | 7/1976 | Lewis | B60R 21/18 280/733 |
| 3,975,258 A | 8/1976 | Fox | |
| 4,370,784 A | 2/1983 | Turnbull | |
| 4,565,991 A | 1/1986 | Lupoli et al. | |
| 5,016,913 A | 5/1991 | Nakajima et al. | |
| 5,346,250 A * | 9/1994 | Kamiyama | A44B 11/2503 280/733 |
| 5,385,367 A * | 1/1995 | Tanaka | B60R 21/18 280/733 |
| 5,445,411 A * | 8/1995 | Kamiyama | A44B 11/2523 280/733 |
| 5,466,003 A * | 11/1995 | Tanaka | A44B 11/2523 280/733 |
| 5,474,326 A * | 12/1995 | Cho | B60R 21/18 280/733 |
| 5,492,363 A | 2/1996 | Hartmeyer et al. | |
| 5,653,741 A | 8/1997 | Grant | |
| 5,727,814 A | 3/1998 | White | |
| 5,730,121 A | 3/1998 | Hawkins, Jr. et al. | |
| 5,765,869 A * | 6/1998 | Huber | B60R 21/18 280/733 |
| 6,019,388 A * | 2/2000 | Okazaki | A44B 11/2523 280/733 |
| 6,062,597 A * | 5/2000 | Suyama | B60R 21/18 280/733 |
| 6,082,763 A * | 7/2000 | Kokeguchi | B60R 21/18 280/733 |
| 6,220,626 B1 | 4/2001 | Utsumi et al. | |
| 6,443,487 B1 | 9/2002 | Suyama | |
| 6,471,243 B1 | 10/2002 | Brown | |
| 6,540,040 B1 * | 4/2003 | Patel | B60R 22/48 180/268 |
| 6,630,414 B1 | 10/2003 | Matsumoto | |
| 6,737,610 B1 | 5/2004 | Horn et al. | |
| 7,201,024 B2 | 4/2007 | Hirayama et al. | |
| 7,434,833 B2 | 10/2008 | Kore | |
| 7,543,849 B2 | 6/2009 | Bradburn | |
| 7,770,921 B2 | 8/2010 | Mueller et al. | |
| 7,788,952 B2 | 9/2010 | Morrison | |
| 7,977,608 B2 | 7/2011 | Diemer et al. | |
| 8,269,512 B2 | 9/2012 | Ootaka | |
| 8,876,580 B2 | 11/2014 | Castro | |
| 9,027,961 B2 | 5/2015 | Yamataki | |
| 9,204,493 B2 | 12/2015 | Yoshimoto et al. | |
| 9,346,430 B2 | 5/2016 | Wang et al. | |
| 9,539,983 B2 | 1/2017 | Demeritte | |
| 9,744,933 B1 * | 8/2017 | Rao | B60R 21/01554 |
| 9,902,358 B2 * | 2/2018 | Okubo | B60R 21/18 |
| 9,981,623 B2 | 5/2018 | Kobata | |
| 10,143,043 B1 | 11/2018 | Elson et al. | |
| 2002/0125701 A1 * | 9/2002 | Devonport | B60R 21/18 280/733 |
| 2002/0125702 A1 * | 9/2002 | Ohhashi | B60R 21/18 280/733 |
| 2003/0038463 A1 * | 2/2003 | Stonich | B60R 21/18 280/733 |
| 2003/0206834 A1 | 11/2003 | Chiao et al. | |
| 2003/0222446 A1 | 12/2003 | Soderquist et al. | |
| 2004/0140660 A1 | 7/2004 | Xu | |
| 2004/0262294 A1 | 12/2004 | Horey et al. | |
| 2006/0208471 A1 | 9/2006 | Sundararajan et al. | |
| 2007/0170710 A1 | 7/2007 | Bouquier | |
| 2009/0301339 A1 | 12/2009 | Ito et al. | |
| 2011/0068565 A1 * | 3/2011 | Arnold | B60R 21/18 280/733 |
| 2011/0282637 A1 | 11/2011 | Yeh | |
| 2012/0055914 A1 | 3/2012 | Goto et al. | |
| 2012/0242115 A1 | 9/2012 | Schreiber | |
| 2013/0026744 A1 | 1/2013 | Fischer et al. | |
| 2013/0106083 A1 | 5/2013 | Burczyk et al. | |
| 2014/0080373 A1 | 3/2014 | Keitch | |
| 2014/0225354 A1 | 8/2014 | Williams et al. | |
| 2014/0246415 A1 | 9/2014 | Wittkowski | |
| 2015/0054268 A1 | 2/2015 | Raines et al. | |
| 2015/0084323 A1 * | 3/2015 | Han | B60R 22/14 280/807 |
| 2016/0059818 A1 * | 3/2016 | Witt | B60R 21/237 280/741 |
| 2016/0059819 A1 * | 3/2016 | Witt | B60R 21/18 280/733 |
| 2016/0236641 A1 * | 8/2016 | Okubo | B60R 21/18 |
| 2016/0250987 A1 * | 9/2016 | Okubo | B60R 21/18 280/729 |
| 2016/0303943 A1 | 10/2016 | Arens et al. | |
| 2017/0190310 A1 | 7/2017 | Okubo et al. | |
| 2017/0196516 A1 * | 7/2017 | Matsumoto | B60R 22/023 |
| 2017/0341621 A1 | 11/2017 | Helvoort et al. | |
| 2018/0281726 A1 * | 10/2018 | Murakami | B60R 21/18 |
| 2019/0023212 A1 | 1/2019 | Spahn et al. | |

FOREIGN PATENT DOCUMENTS

| | | |
|---|---|---|
| FR | 2765834 A1 | 1/1999 |
| JP | 4331853 B2 | 9/2009 |
| JP | 2013226882 A | 11/2013 |
| JP | 2015039901 A | 3/2015 |
| JP | 2016144980 A | 8/2016 |
| WO | 2015061494 A1 | 4/2015 |

OTHER PUBLICATIONS

U.S. Appl. No. 15/834,191, filed Dec. 7, 2017, entitled "Heated Seat Belt," (21 pages of specification and 22 pages of drawings) and filing receipt.

U.S. Appl. No. 15/834,217, filed Dec. 7, 2017, entitled "Vehicle Seat Belt System Having Uniform Air Delivery," (14 pages of specification and 8 pages of drawings) and filing receipt.

U.S. Appl. No. 15/834,247, filed Dec. 7, 2017, entitled "Vehicle Seat Belt System Having Air Distribution Manifold," (12 pages of specification and 5 pages of drawings) and filing receipt.

U.S. Appl. No. 15/653,602, filed Jul. 19, 2017, entitled "Tubular Seat Belt System Having Air Delivery," (13 pages of specification and 7 pages of drawings) and filing receipt.

U.S. Statutory Invention Registration No. H902, published Apr. 2, 1991, to Rousseau.

* cited by examiner

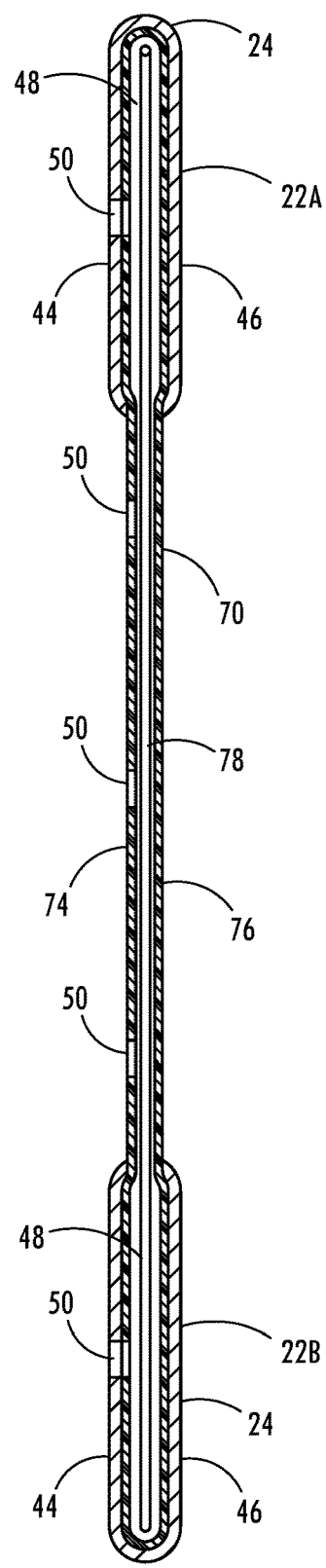
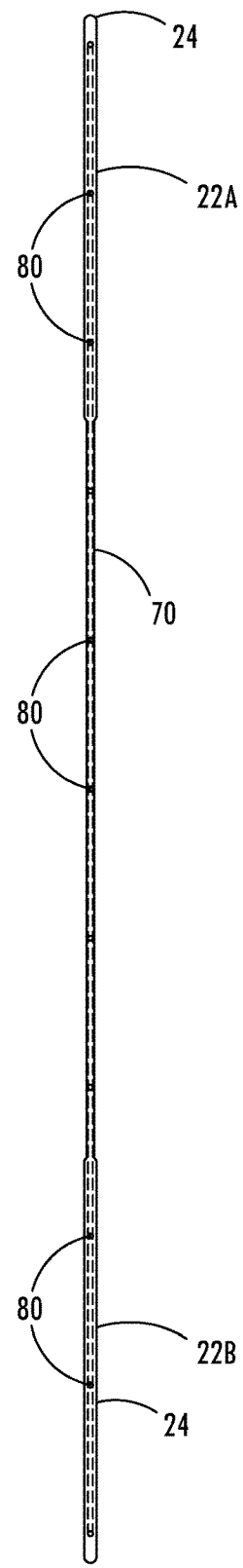
FIG. 7  FIG. 8

VEHICLE SEAT BELT HAVING TUBES FOR AIR DELIVERY

FIELD OF THE INVENTION

The present invention generally relates to vehicle seat belts, and more particularly relates to the delivery of air through the seat belt for enhanced seat belt comfort.

BACKGROUND OF THE INVENTION

Automotive vehicles are typically equipped with seat belts for restraining passengers seated in vehicle seats. Conventional seat belts typically include a lap belt and a shoulder belt connected to a buckle which, in turn, connects to the vehicle structure, such as a seat or floor. The seat belt is typically made of a seat belt webbing that contacts the body of the seated passenger. The webbing may be somewhat permeable to water vapor and can buildup thermal energy and cause discomfort for some passengers. It is desirable to provide for a seat belt system that provides enhanced air flow for the seated passenger.

SUMMARY OF THE INVENTION

According to one aspect of the present invention, a vehicle seat belt system is provided. The vehicle seat belt system includes a seat belt comprising first and second seat belt webbings each defining a passageway, one or more tubular extension members extending between the first and second seat belt webbings, a plurality of exhaust openings formed in at least one of the first and second webbings, and an air delivery device supplying air to the seat belt.

Embodiments of the first aspect of the invention can include any one or a combination of the following features:
- the first webbing comprises a shoulder belt webbing and the second webbing comprises a lap belt webbing;
- the at least one tubular extension member comprises a plurality of tubular extension members;
- the plurality of exhaust openings are further formed in the at least one tubular member;
- the plurality of exhaust openings are formed in both the first and second webbings;
- the vehicle seat belt system further comprises a buckle for connecting with the seat belt, wherein air from the air delivery system enters the first and second webbings through the buckle;
- the vehicle seat belt system further comprises a heater element provided on the seat belt; and
- the heater element is provided on at least one of the first and second seat belt webbings.

According to another aspect of the present invention, a vehicle seat belt system is provided. The vehicle seat belt system includes a seat belt comprising a shoulder belt webbing and a lap belt webbing each defining a passageway, and one or more tubular extension members extending between the shoulder belt webbing and the lap belt webbing. The vehicle seat belt system also includes a plurality of exhaust openings formed in at least one of the shoulder and lap belt webbings, and an air delivery device supplying air to the passageways in the shoulder and lap belt webbings and the passageway in the one or more extension members.

Embodiments of the second aspect of the invention can include any one or a combination of the following features:
- the at least one tubular extension member comprises a plurality of tubular extension members;
- the plurality of exhaust openings are further formed in the at least one tubular member;
- the plurality of exhaust openings are formed in both the shoulder and lap belt webbings;
- the vehicle seat belt system further comprises a buckle for connecting with the seat belt, wherein air from the air delivery system enters the shoulder and lap belt webbings through the buckle;
- the vehicle seat belt system further comprising a heater element provided on the seat belt;
- the heater element is provided on at least one of the shoulder and lap belt webbings; and
- each extension member has a passageway operatively coupled to the passageways of the shoulder and lap belt webbings.

According to yet another aspect of the present invention a vehicle seat belt system is provided. The vehicle seat belt system includes a seat belt comprising first and second seat belt webbings, one or more extension members extending between the first and second seat belt webbings, and a heater provided on or in at least one of the one or more extension members.

Embodiments of the third aspect of the invention can include any one or a combination of the following features:
- the one or more extension members comprise a planar material having a resistive heating element provided on or within the planar material; and
- the one or more extension members comprise one or more tubular extension members, wherein the heater is provided on or within a passageway in the one or more tubular extension members.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a cross-sectional view taken through one of the tubular extension members showing a heater disposed within the passageway, according to another embodiment; and FIG. 8 is a cross-sectional view taken through a planar seat belt webbing having a heater provided therein, according to a further embodiment.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
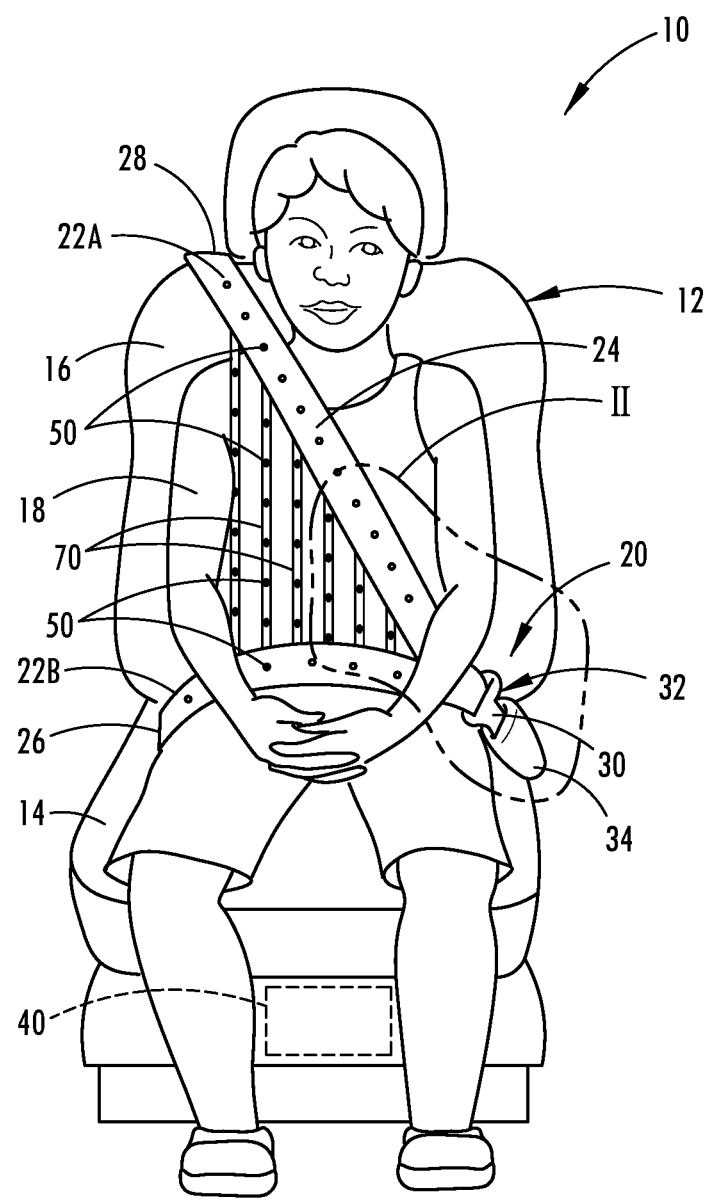
FIG. 1 is a perspective view of the passenger cabin of an automotive vehicle having a seat belt system restraining a person seated on a seat assembly and configured with air delivery, according to one embodiment.

Referring now to FIG. 1, a portion of the passenger cabin or compartment of a vehicle 10 is generally illustrated having a seat belt system 20 assembled onto a seat assembly 12 and including an air delivery arrangement for delivering forced air to passageways in the seat belt webbing and tubular extension members for distribution via exhaust openings, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger 18. It should be appreciated that the vehicle 10 may include a plurality of seat assemblies 12 each including a seat belt system 20 as shown and described herein.

The seat belt system 20 is shown in this embodiment as a three-point seat belt configuration having a tubular seat belt webbing 24 connected at a first connection point 28 generally near the top of the seat back 16 or another supporting portion within the vehicle such as the B-pillar, a second connection point 26 connected to the floor or the seat 14 of the vehicle generally in the region of the lap of the passenger seated on the seat 14, and a third connection point 30 shown connected to a connector tongue 32 which releasably connects or fastens to a seat belt buckle 34. The first and second connection points 26 and 28 may connect or lead to belt retractors for retracting the belt and allowing the belt to extend from a reel. The connector tongue 32 is matingly and releasably coupled to the seat belt buckle 34 for fastening the connector tongue 32 onto the buckle 34. The seat belt system 20 includes the seat belt comprising the tubular seat belt webbing 24 defining an interior passageway and a plurality of air exhaust openings 50 formed therein. In the embodiments shown, the seat belt webbing 24 includes a first seat belt webbing configured as a shoulder belt 22A that is generally positioned to extend from the lap over the shoulder and chest of a passenger and a second seat belt webbing configured as a lap belt 22B which is positioned to extend over the lap of the passenger when seated in the seat assembly 12. The lap belt 22B and shoulder belt 22A each define a passageway therein and the passageway may be connected to one another to allow air flowing therebetween. In other embodiments, the lap belt 22B and shoulder belt 22A may be separate belts. It should be appreciated that the shoulder belt 22A and lap belt 22B as shown each include the tubular passageway operatively coupled to the air delivery device and air exhaust openings 50 for delivering and outputting forced air, according to various embodiments.

The seat belt system 20 also includes one or more tubular extension members 70 extending between the first seat belt webbing forming the shoulder belt 22A and the second seat belt webbing forming the lap belt 22B. In the embodiment shown, a plurality of tubular extension members 70 provide tubes that are connected to and extend between the shoulder belt 22A and lap belt 22B. Each of the tubular extension members 70 has a passageway 78 formed therein which is operatively coupled to the passageways 48 provided within each of the shoulder belt 22A and lap belt 22B. As such, air is able to pass freely between the passageways 48 and 78 and be output via the exhaust openings 50.

In the embodiment shown, each of the tubular extension members 70 has a plurality of exhaust openings 50 formed therein. As such, both the first and second seat belt webbings forming the shoulder belt 22A and lap belt 22B and the tubular extension members 70 include the exhaust openings 50. It is contemplated that the exhaust openings 50 may be provided in one or both of the shoulder belt 22A and the lap belt 22B and not present in the tubular extension members 70, according to other embodiments. Further, exhaust openings 50 may be included in the one or more tubular extension members 70 and not present in one or both of the shoulder belt 22A and lap belt 22B.

The vehicle seat belt system 20 also includes an air delivery device 40 for supplying forced air to the seat belt webbing 24. The air delivery device 40 may be located within or below the vehicle seat assembly 12, as shown in FIG. 1, according to one embodiment. It should be appreciated that the air delivery device 40 may be a shared or dedicated air delivery system and may be located elsewhere on the vehicle. The air delivery device 40 may include a heating, ventilation and air conditioning (HVAC) system for delivering heated or cooled air through air ducts. In addition, the air delivery device 40 may deliver air in the form of increased concentrations of oxygen, humidified air, or olfactory scented air, which may be delivered into passageways 48 within the seat belt webbing 24 and passageway 78 within the tubular extension members 70 and output through the exhaust openings 50. The air delivery device 40 delivers forced air into the supply passageway 36 in the seat belt buckle 34 and the forced air passes through the connector tongue 32 into the seat belt passageway 48 in the seat belt webbing 24 and into the passageways 78 in the tubular extension members 70, according to one embodiment.

Figure 2:
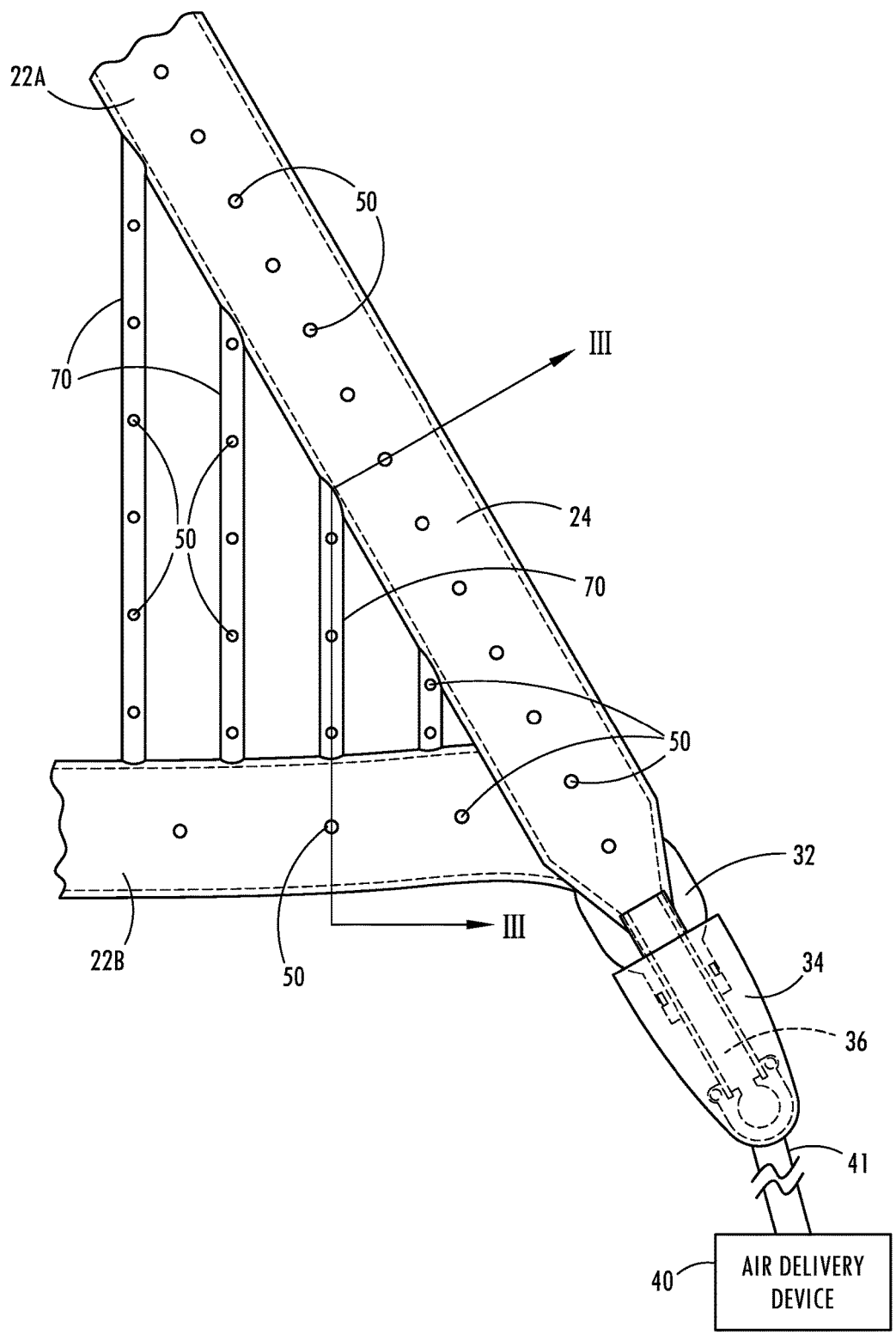
FIG. 2 is an enlarged view of a portion of the seat belt system illustrating an air delivery system coupled to the seat belt buckle for delivery of air to seat belt webbing.

As seen in FIG. 2, the air delivery device 40 delivers forced air to the air flow supply passageway 36 within the seat belt buckle 34 and the connector tongue 32 fastened thereto. The connector tongue 32 and buckle 34 may have cooperating interior chambers that form the air flow supply passageway 36 similar to those employed in a seat belt airbag system, according to one embodiment. The air delivery device 40 may include a fan to force air into the seat belt passageway 48 in the seat belt webbing 24 and the passageways 78 in the tubular extension members 70. The forced air builds up pressure within the passageways 48 and 78 due to resistance in the partially closed chamber formed by the passageways 48 and 78. The air delivery device 40 delivers forced air via a tube 41 into the air supply passageway 36 at a pressure to blow air into seat belt passageways 48 and 78 and out of the exhaust openings 50 in close proximity to the occupant. It should be appreciated that the vehicle seat belt system 20 may also employ a seat belt airbag which may share an air delivery passageway in the connector tongue 32 and buckle 34.

The vehicle seat belt system 20 includes the seat belt having the tubular seat belt webbing 24 defining the seat belt passageway 48 in both the shoulder belt 22A and the lap belt 22B and a plurality of outlets or exhaust openings 50 located on one or both of the shoulder belt 22A and the lap belt 22B with the seat belt configured such that air flow out of the exhaust openings 50. In addition, the vehicle seat belt system 20 has a plurality of exhaust openings 50 formed in the tubular extension members 70 such that air may pass between passageways 48 within passageways 78 and exit the exhaust openings 50 on the tubular extension members. By providing interconnecting passageways 48 within the tubular extension member 70, air is able to flow between passageways 48 extending between the first and second seat belt webbings and to be expelled via exhaust openings 50 therein which further distributes the air more uniformly across an area proximate to the occupant.

In the embodiment shown, the exhaust openings 50 have a substantially circular shape and a uniform diameter. However, it should be appreciated that the exhaust openings 50 may have other shapes and sizes and may be located in other configurations.

Figure 3:
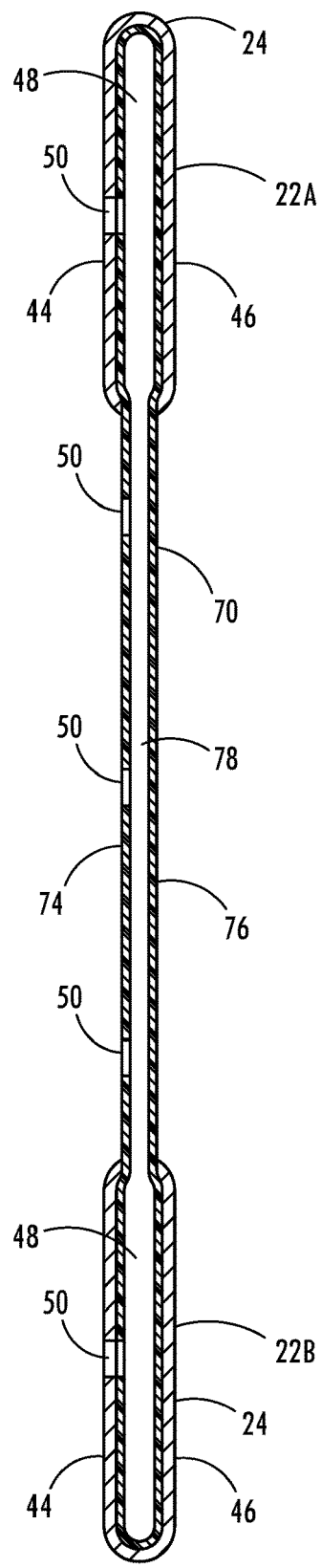
FIG. 3 is a cross-sectional view taken through line of FIG. 2 further illustrating the air flow passages.

As seen in FIG. 3, the tubular seat belt webbing 24 is shown in a somewhat collapsed or flattened state having a top layer 44 connected to or integrally formed with a bottom layer 46 with the seat belt passageway 48 therebetween. The seat belt webbing 24 may be formed of a non-permeable material that prevents air from flowing through the material or substantially prevents air from flowing through the material, with the exception of air flowing through the exhaust openings 50. One example of a material suitable for forming the seat belt webbing 24 is a woven polyester which may be coated with a silicone layer to achieve a desired low level or no air permeability.

The tubular extension members 70 are also shown each forming a tube in a somewhat collapsed or flattened state and having a top layer 74 connected to or integrally formed with a bottom layer 76 with the passageway 78 therebetween. The tubular extension members 70 may be formed of an elastic material that stretches to an extended position when the seat belt extends across a body of an occupant and is fastened to the buckle 34 and contracts to a shorter length when the seat belt is retracted to a stowed position. The tubular extension member 70 may be formed of a non-air permeable material that prevents air from flowing through the material or substantially prevents air from flowing through the material, with the exception of air flowing through the exhaust openings 50. One example of a material suitable for forming the tubular extension member 70 is a rubber elastic material. Other examples of suitable material for forming the tubular extension members include a spandex nylon. The tubular extension members 70 may be connected to the first and second seat belt webbings by an adhesive, a thermoformed material, an extruded material, welded material or stitching, according to various embodiments, such that the air flow passageways 78 are operatively coupled and exposed to the passageways 48 within the first and second seat belt webbings.

In the embodiment shown, the exhaust openings 50 are formed in the top layer 44 of the webbing 24 such that the pressurized air output from the exhaust openings 50 is blown in close proximity to and around the occupant seated in the seat. The air thereby blows outward from the occupant and creates an air distribution zone around the occupant. Alternatively or in addition, the air exhaust openings 50 could be located in the bottom layer 46 or sides of webbing 24 and bottom layer or sides of the tubular extension members 70 to blow air onto the occupant or very close to the occupant.

Exhaust openings are also shown formed in the top layer 74 of the tubular extension members 70 such that the pressurized air output from the exhaust openings 50 on tubular extension members 70 is blown in close proximity to or around the occupant seated in the seat. The air exhausted via exhaust openings 50 in the tubular extension members 70 blows outward from the occupant to further create an air distribution zone around the occupant. Alternatively or in addition, the air exhaust openings 50 formed in the tubular extension members 70 could be located in the bottom layer 76 or sides of the tubular extension members 70 to blow air onto the occupant or very close to the occupant.

Figure 4:
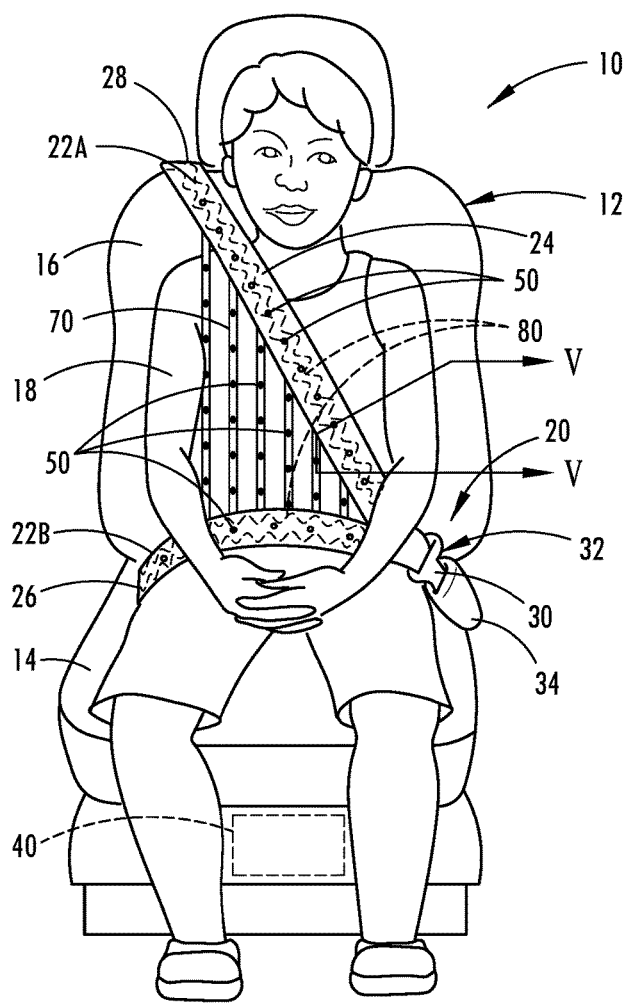
FIG. 4 is a perspective view of the passenger cabin of the vehicle having a seat belt system restraining a person seated on a seat assembly and configured with air delivery and an electric heater, according to another embodiment.
Figure 5:
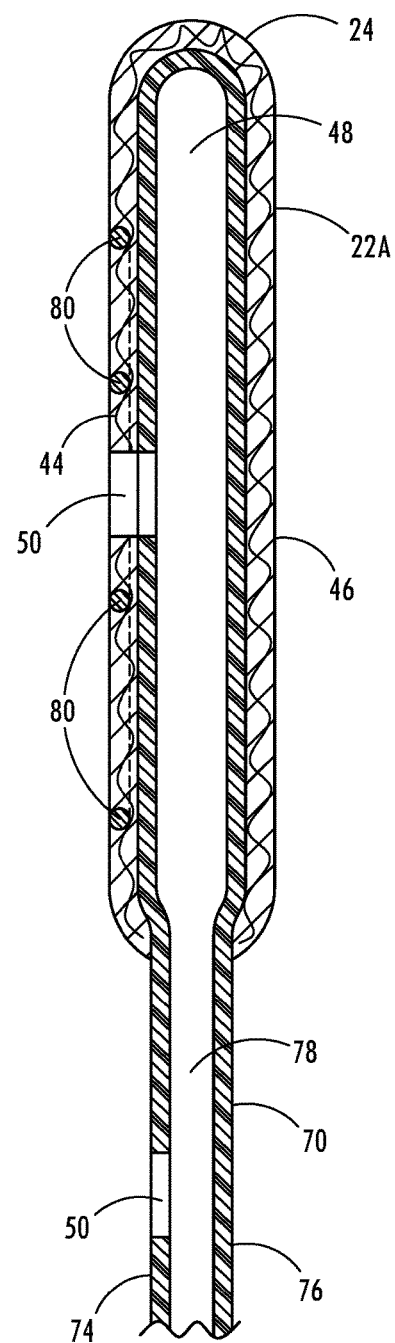
FIG. 5 is a cross-sectional view taken through line V-V of FIG. 4 further illustrating the air flow passages and heater.

Referring to FIGS. 4 and 5, the seat belt system 20 is illustrated having the tubular seat belt webbing 24 and tubular extension member 70 with exhaust openings 50 formed in both the first and second seat belt webbings and the tubular extension member 70, and in addition, an electric heater 80 is formed within each of the first and second seat belt webbings. The electric heater 80 may be formed of an electrically conductive material that allows electric current to flow therethrough to generate heat to heat the seat belt webbing. The electric heater 80 may extend through one or both of the shoulder belt 22A and lap belt 22B, according to one embodiment. According to other embodiments, the electric heater 80 may also further extend on or within the tubular extension members 70. The electric heater 80 may include one or more heaters each having conductors and circuitry that provides a circuit path through the connector tongue 32 and buckle 34 to a power source that provides electrical current, according to one embodiment. In this embodiment, the electric heaters 80 may provide heating to the seat belt, while the passageways 48 and 78 may deliver cooling air. In other embodiments, the passageways 48 and 78 may deliver either cooling or heated air, and the electric heater 80 may act as a supplemental heater. The heater may include a resistive heating element such as a wire or sheet. One or more thermoelectric devices could be included in the seat belt and/or one or more tubular extension members 70.

Figure 6:
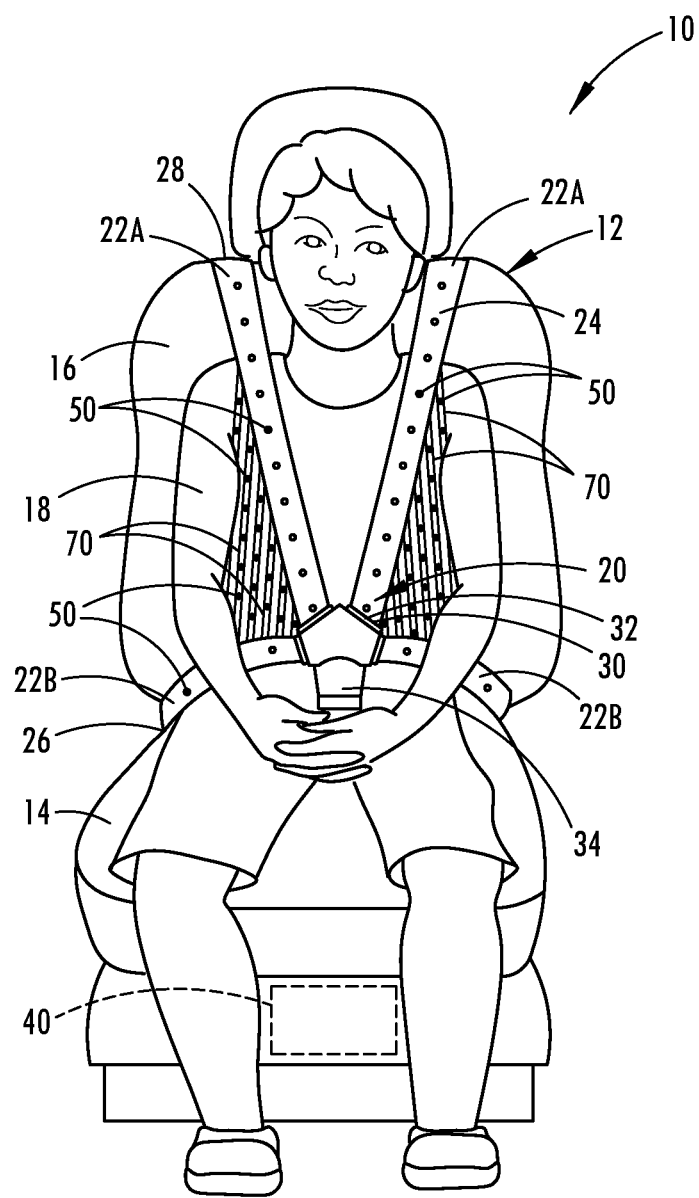
FIG. 6 is a perspective view of the passenger cabin of the vehicle having a seat belt system restraining a person seated on a seat assembly configured with air delivery for a five-point harness, according to a further embodiment.

Referring to FIG. 6, the seat belt system is shown as a five-point seat belt configuration having two shoulder belts 22A on opposite left and right side shoulders of the occupant and two lap belts 22B on opposite sides of the occupant's lap and a centrally mounted buckle 34 that extends from the seat forward and engages tongue connectors that connect the shoulder belts 22A with the lap belts 22B and the buckle 34. In this embodiment, a plurality of tubular extension members 70 are shown connecting from the shoulder belts 22A to the respective side of the lap belts 22B on both sides. Each of the tubular extension members 70 has a passageway 78 that connects with the passageway 48 within the shoulder belt 22A and the lap belt 22B to allow air to flow therethrough. Additionally, exhaust openings 50 are formed in the shoulder belts 22A, lap belts 22B and the tubular extension members 70.

It should be appreciated that other seat belt arrangements other than three-point and five-point connection seat belts may employ tubular extension members 70 as described herein. Additionally, it should be appreciated that the tubular extension members 70 may extend between other seat belt members, such as connecting between a first shoulder belt 22A and a second shoulder belt 22A, according to further embodiments.

Referring to FIG. 7, a tubular extension member 70 is shown that extends between first and second seat belt webbings 22A and 22B, such as a shoulder belt webbing and a lap belt webbing. The tubular extension member 70 includes a heater 80 provided within the passageway 78 of the extension member 70 to provide heating in the extension member 70. The heater 80 may include a resistive heating element, such as a resistive heating wire or sheet. Alternatively, in lieu of a heating element, a thermoelectric device may be located within the passageway 78.

Referring to FIG. 8, a planar extension member 70 having a planar material is shown connected between first and second seat belt webbings 22A and 22B, such as a shoulder belt and lap belt. The planar extension member 70 may include a heater 80 provided thereon or within, such as sewn or stitched within the planar material of the extension member 70. The heater 80 may include a resistive heating element, such as a wire or a sheet. It should be appreciated that the heater 80 may extend within or on the planar material of the one or more of the plurality of extension members 70.

Accordingly, the vehicle seat belt system 20 advantageously provides for a plurality of tubular extension members 70 that extend between first and second seat belt webbings, each having passageways that allow forced air to flow through the seat belt webbings and the tubular extension members. Additionally, a plurality of exhaust openings are formed in the first and second seat belt webbings and the tubular extension members to provide for enhanced air flow distribution proximate to the occupant. The system 20 thereby advantageously provides for enhanced air distribution.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat belt system comprising:
a seat belt comprising first and second seat belt webbings each defining a passageway;
one or more tubular extension members extending between the first and second seat belt webbings;
a plurality of exhaust openings formed in at least one of the first and second webbings and formed in the one or more tubular extension members; and
an air delivery device supplying air to the seat belt.

2. The vehicle seat belt system of claim 1, wherein the first webbing comprises a shoulder belt webbing and the second webbing comprises a lap belt webbing.

3. The vehicle seat belt system of claim 1, wherein the one or more tubular extension members comprises a plurality of tubular extension members.

4. The vehicle seat belt system of claim 1, wherein the plurality of exhaust openings are formed in both the first and second webbings.

5. The vehicle seat belt system of claim 1 further comprising a buckle for connecting with the seat belt, wherein the air from the air delivery system enters the first and second webbings through the buckle.

6. The vehicle seat belt system of claim 1 further comprising a heater provided on or in the one or more tubular extension members.

7. The vehicle seat belt system of claim 1 further comprising a heater provided on the seat belt.

8. The vehicle seat belt system of claim 7, wherein the heater is provided on at least one of the first and second seat belt webbings.

9. A vehicle seat belt system comprising:
a seat belt comprising a shoulder belt webbing and a lap belt webbing each defining a passageway;
one or more tubular extension members extending between the shoulder belt webbing and the lap belt webbing, wherein the one or more tubular extension members stretch to an extended position across a body of a user and retract to a stowed position;
a plurality of exhaust openings formed in at least one of the shoulder and lap belt webbings; and
an air delivery device supplying air to the passageways in the shoulder and lap belt webbings and a passageway in each of the one or more extension members.

10. The vehicle seat belt system of claim 9, wherein the one or more tubular extension members comprises a plurality of tubular extension members.

11. The vehicle seat belt system of claim 9, wherein the plurality of exhaust openings are further formed in the one or more tubular extension members.

12. The vehicle seat belt system of claim 9, wherein the plurality of exhaust openings are formed in both the shoulder and lap belt webbings.

13. The vehicle seat belt system of claim 9 further comprising a buckle for connecting with the seat belt, wherein the air from the air delivery system enters the shoulder and lap belt webbings through the buckle.

14. The vehicle seat belt system of claim 9 further comprising a heater provided on the seat belt, wherein the heater is provided on at least one of the shoulder and lap belt webbings.

15. The vehicle seat belt system of claim 9, wherein each extension member has a passageway operatively coupled to the passageways of the shoulder and lap belt webbings.

16. The vehicle seat belt system of claim 9 further comprising a heater provided on or in the one or more tubular extension members.

17. A vehicle seat belt system comprising:
a seat belt comprising first and second seat belt webbings;
one or more extension members extending between the first and second seat belt webbings, wherein the one or more extension members stretch between an extended position across a body of a user and retract to a stowed position; and
a heater comprising a heating element provided on or in at least one of the one or more extension members.

18. The vehicle seat belt system of claim 17, wherein the one or more extension members comprise a planar material having a resistive heating element provided on or within the planar material.

19. The vehicle seat belt system of claim 17, wherein the one or more extension members comprise one or more tubular extension members, wherein the heater is provided on or within a passageway in the one or more tubular extension members.

* * * * *